Patented Nov. 6, 1928.

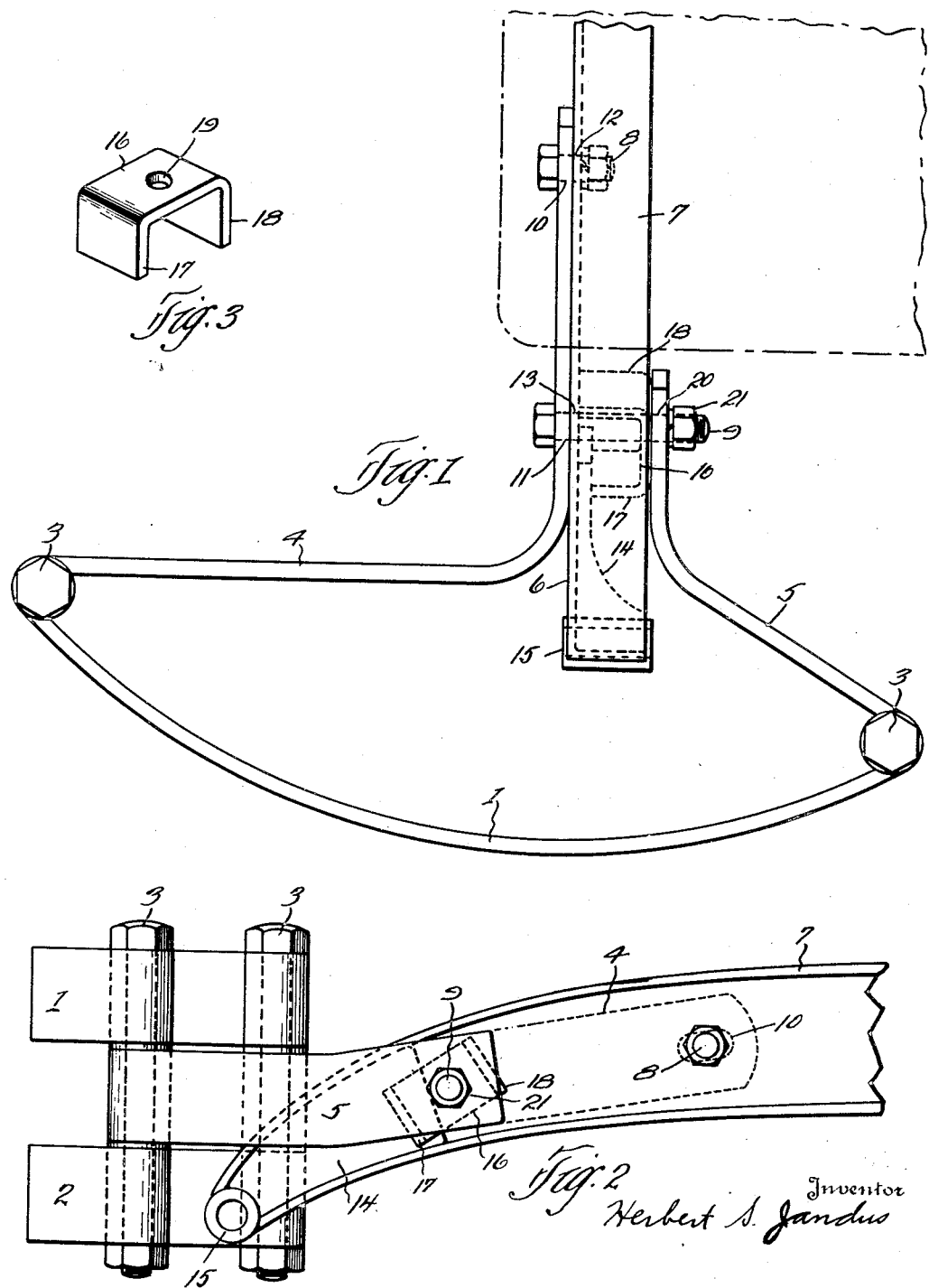

1,690,821

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER-ATTACHING MEANS.

Application filed January 14, 1927. Serial No. 161,208.

This invention relates to an automobile bumper and more particularly to means for attaching the bumper support arms to the automobile frame. The general object of this invention is to provide an attaching means by which the bumper can be quickly and conveniently attached to the spring horn of a vehicle and which will insure a rigid support for the impact element.

Further objects of my invention will be apparent from the description and drawings and from the use of the combinations of elements covered by the claims.

In the drawings Fig. 1 represents a plan view of a rear bumper connected to the spring horn at one side of an automobile; Fig. 2 shows a side elevation of the bumper and attaching means shown in Fig. 1; Fig. 3 shows a detail perspective view of the bearing plate used in connecting the bumper support.

In describing the invention by reference to the characters shown in the drawings, 1 and 2 denote vertically spaced impact bars having eyes in their ends and connected at their ends to the ends of support arms 4 and 5 by means of pins 3 passing through the eyes at the ends of the impact bars and eyes at the ends of the support arms. The support arm 4 is bent forward and adapted for attachment to the web 6 of the channel-shaped spring horn 7 by means of the bolts 8 and 9 passing respectively through the elongated hole 10 and the hole 11 in the support arm 4 which register with the holes 12 and 13 in the web 6.

Near the end of the channel-shaped spring horn 7 there is fastened a metal casting 14 having an eye 15 at its outer end for the reception of the spring shackle bolt. The forward end of this casting is tapered off and runs parallel to the web 6 of the spring horn, and is fastened thereto. In order to support the forwardly projecting portion of the arm 5 a U-shaped bearing plate 16 having one leg 17 shorter than the other leg 18 is placed within the channel 7 with the leg 18 resting upon the web 6 of the channel 7 and the leg 17 resting upon the casting 14. The bolt 9 passes through a hole 19 in the bearing plate 16 and a hole 20 in the support arm 5 and by means of a nut 21 on the bolt 9 the support arms 4 and 5 are firmly fastened to the spring horn 7.

In the drawings a bumper is shown attached to only one side of the automobile. It is apparent that a similar attachment will be made to the other side. It is also apparent that the above disclosed means for attaching the support arm to the spring horn could be used with bumpers differing from that shown in the drawings and might be used with a bumper having an impact member extending across the entire end of the automobile.

It is further apparent that this means for attaching the supporting arm 5 might be used in connection with other forms of frame members having uneven bearing surfaces for such arm.

Having thus described my invention, what I claim is:—

1. The combination of an impact element, an arm for supporting the impact element from an automobile frame, and means for attaching said arm to an uneven surface, said means consisting of a U-shaped bearing plate having one leg shorter than the other, and a clamping device for holding the support arm in position against said bearing plate.

2. The combination of an impact element, an arm for supporting the said element from a channel member, and means for attaching the arm to the said member, said means consisting of a U-shaped bearing plate adapted at its ends to bear upon a surface within the channel member and at its central portion upon the surface of the support arm, and a bolt passing through the bearing plate and the arm for holding the arm in position against said bearing plate.

3. The combination of an impact element, a channel shaped member having an uneven inner surface, a support arm for supporting said impact element from the said member, and means for attaching the support arm to the said member, said means consisting of a U-shaped bearing plate having one leg shorter than the other and adapted to bear upon the inner surface of the said member, and a clamping device for holding the support arm in position against said bearing plate.

4. The combination of support arms for an automobile bumper and means for attaching one of said arms to the inner surface of a channel member, said means consisting of a U-shaped bearing plate adapted to bear at its ends upon the inner surface of the member, and means for securing such arm to the said member and against the said bearing plate.

5. The combination of an impact element, arms for supporting the said element from a channel member, and means for attaching the arms to the said member, said means consisting of a U-shaped bearing plate adapted to bear at each end upon a surface within the channel member and at its central portion upon the surface of one of the support arms, and a bolt passing through the bearing plate for holding the support arms in position.

6. The combination of a channel-shaped spring horn, a spring support carried by the web of said spring horn, an impact element, an arm for supporting said impact element and means, including a U-shaped bearing plate having a long leg adapted to bear upon the web of the spring horn and a short leg adapted to bear upon the spring support and a clamping device, for securing said arm to the said spring horn and against the said bearing plate.

7. The combination of a channel-shaped spring horn, a casting carried by the web of said spring horn, an impact element, arms for supporting said impact element, and means for securing said arms to the spring horn, said means including a U-shaped plate having a long leg adapted to bear upon the web of the spring horn and a short leg adapted to bear upon the casting and a bolt passing through the said bearing plate and support arms.

8. The combination of an impact element, an arm for supporting said element and adapted to be pivotally connected to it, and means for attaching said arm to an uneven surface, said means consisting of a U-shaped plate having one leg shorter than the other and a clamping device for holding the support arm in position against said plate.

9. The combination of an impact element, support arms adapted at their outer ends to be pivotally connected to the said impact element and at their inner ends to be connected to a channel member, and means for securing said arms to said channel member, said means consisting of a bearing plate adapted to bear upon a surface within the channel member and upon the surface of one of the support arms and a bolt passing through the bearing plate and arms for securing them in position.

10. The combination of an impact element, an arm for supporting said impact element from a channel member and means for securing said arm to said channel member, said means including a bearing plate adapted to bear upon an uneven surface within the channel member and upon the arm, and a clamping device for holding the bearing plate in position against the channel member and the support arm in position against the said bearing plate.

11. The combination of a channel-shaped spring horn having a casting carried by its web, an impact element, support arms adapted to be pivotally connected to said impact element and to be secured to said spring horn, and means for securing the arms to the spring horn, said means including a U-shaped bearing plate adapted to bear at one end upon the web of the spring horn and at the other end upon the casting and a bolt passing through the said bearing plate and arms.

12. The combination with a channel shaped vehicle member and a support arm to be supported from a surface within said channel member, of a bearing plate positioned between said surface and a surface of said support arm and having end portions adapted to bear upon one of said surfaces and an intermediate portion adapted to bear upon the other surface.

13. The combination with a curved channel shaped vehicle member and a support arm to be supported from a surface within said channel member and to extend across an edge of a flange thereof, of a bearing plate extending between said support arm and said surface and having surfaces adapted to bear upon said channel surface and said support arm, and means for clamping said support arm in contact with said bearing plate.

14. The combination with a channel shaped vehicle member and a pair of support arms adapted to be supported from opposite sides of the web of said channel member, of a bearing plate adapted to extend between the inner surface of said web and the adjacent surface of the support arm on that side and having end portions adapted to bear upon one of said surfaces and an intermediate portion adapted to bear upon the other of said surfaces, and means for clamping said support arm and bearing plate to said channel web.

15. The combination with a channel shaped vehicle member having an uneven inner surface and a support arm adapted to be supported from said surface, of a bearing plate positioned between said channel surface and said arm and having a corresponding inner surface adapted to bear upon said channel surface and a surface adapted to bear upon said support arm, and clamp means for drawing said support arm toward said channel member.

16. The combination with a channel shaped vehicle member having an uneven inner surface and a support arm adapted to extend across an edge of a flange of said channel member and to be supported from said uneven surface, of a bearing plate positioned between said uneven surface and said support arm and having corresponding uneven surfaces adapted to bear upon said channel surface and a surface adapted to bear upon said support arm, and means for drawing said support arm toward said uneven channel surface.

In testimony whereof, I hereunto affix my signature.

HERBERT S. JANDUS.